(12) United States Patent
Kitano

(10) Patent No.: US 9,637,666 B2
(45) Date of Patent: May 2, 2017

(54) COMPOSITION, ADHESIVE AND LAYERED BODY

(71) Applicant: BRIDGESTONE CORPORATION, Chuo-ku, Tokyo (JP)

(72) Inventor: Hajime Kitano, Kodaira (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 196 days.

(21) Appl. No.: 14/580,475

(22) Filed: Dec. 23, 2014

(65) Prior Publication Data

US 2015/0175857 A1    Jun. 25, 2015

(30) Foreign Application Priority Data

Dec. 24, 2013  (JP) ................. 2013-265936

(51) Int. Cl.
| | | |
|---|---|---|
| *C09J 163/04* | (2006.01) | |
| *C09J 163/00* | (2006.01) | |
| *C08K 5/5425* | (2006.01) | |
| *B32B 25/12* | (2006.01) | |
| *B32B 25/14* | (2006.01) | |
| *B32B 27/38* | (2006.01) | |
| *B32B 25/08* | (2006.01) | |
| *B32B 27/06* | (2006.01) | |
| *B32B 7/12* | (2006.01) | |
| *B32B 7/00* | (2006.01) | |
| *B32B 15/00* | (2006.01) | |
| *B32B 15/04* | (2006.01) | |
| *B32B 25/00* | (2006.01) | |
| *B32B 25/04* | (2006.01) | |
| *C08G 59/32* | (2006.01) | |
| *C08G 59/66* | (2006.01) | |
| *C08G 59/68* | (2006.01) | |

(52) U.S. Cl.
CPC ............... *C09J 163/04* (2013.01); *B32B 7/00* (2013.01); *B32B 7/12* (2013.01); *B32B 15/00* (2013.01); *B32B 15/04* (2013.01); *B32B 25/00* (2013.01); *B32B 25/04* (2013.01); *B32B 25/08* (2013.01); *B32B 25/12* (2013.01); *B32B 25/14* (2013.01); *B32B 27/06* (2013.01); *B32B 27/38* (2013.01); *C08G 59/3218* (2013.01); *C08G 59/66* (2013.01); *C08G 59/686* (2013.01); *C08K 5/5425* (2013.01); *C09J 163/00* (2013.01); *B32B 2250/03* (2013.01); *B32B 2319/00* (2013.01); *B32B 2363/00* (2013.01); *B32B 2405/00* (2013.01); *Y10T 428/31515* (2015.04)

(58) Field of Classification Search
CPC .......... C09J 163/04; B32B 25/12; B32B 27/38
USPC ........................................... 428/414
See application file for complete search history.

(56) References Cited

U.S. PATENT DOCUMENTS

| | | | |
|---|---|---|---|
| 3,819,399 A * | 6/1974 | Campbell ................ | B05D 5/10 156/124 |
| 5,972,423 A | 10/1999 | Abbey et al. | |
| 2007/0096056 A1 | 5/2007 | Takeuchi et al. | |
| 2010/0022745 A1 | 1/2010 | Takeuchi et al. | |
| 2010/0227949 A1 * | 9/2010 | Tamai ................... | C08F 299/00 523/400 |
| 2011/0003920 A1 * | 1/2011 | Matsuda ............... | B60C 15/036 524/156 |

FOREIGN PATENT DOCUMENTS

| | | |
|---|---|---|
| CN | 1886437 A | 12/2006 |
| EP | 1970408 A1 | 9/2008 |
| JP | 06-136100 * | 5/1994 |
| JP | 10-139901 A | 5/1998 |
| JP | 2001131262 A | 5/2001 |
| JP | 2012246422 A | 12/2012 |
| JP | 2012246423 A | 12/2012 |
| JP | 2012246424 A | 12/2012 |
| JP | 2012246425 A | 12/2012 |
| JP | 2012246463 A | 12/2012 |
| JP | 2012246464 A | 12/2012 |
| JP | 2013087149 A | 5/2013 |
| WO | 2012082224 A1 | 6/2012 |
| WO | 2012132203 A1 | 10/2012 |

OTHER PUBLICATIONS

Machine translation of JP 06-136100 (no date).*

* cited by examiner

*Primary Examiner* — Doris Lee
(74) *Attorney, Agent, or Firm* — Sughrue Mion, PLLC

(57) ABSTRACT

A composition includes: a polythiol compound; a compound having plural epoxy groups; a radical generator; and an amine-based catalyst. In the composition, the ratio (Ep/SH (epoxy groups/thiol groups)) of the total molar number (Ep) of epoxy groups contained in the compound having plural epoxy groups to the total molar number (SH) of thiol groups contained in the polythiol compound is 0.50 or higher but lower than 2.00.

16 Claims, No Drawings

COMPOSITION, ADHESIVE AND LAYERED BODY

CROSS-REFERENCE TO RELATED APPLICATION

This application is based on and claims priority under 35 USC 119 from Japanese patent Application No. 2013-265936, filed Dec. 24, 2013, the disclosure of which is incorporated by reference herein.

TECHNICAL FIELD

The present disclosure relates to a composition, an adhesive and a layered body, and more specifically relates to a composition and an adhesive that are suitable for adhesion to rubber, and a layered body in which a rubber layer is adhered using the composition.

BACKGROUND ART

Although materials exhibiting excellent adhesive power to vulcanized rubber have thus far been desired, there has not been a material which provides sufficient adhesion power to vulcanized rubber. Methods employed for adhering vulcanized rubber are disclosed, for example, in Japanese Patent Application Laid-open (JP-A) No. H10-139901. In the method disclosed in JP-A No. H10-139901, vulcanized rubber is surface-treated, and another member is adhered to the surface-treated face using an adhesive.

SUMMARY

According to an aspect of the disclosure, a composition that includes a polythiol compound, a compound having plural epoxy groups, a radical generator, and an amine-based catalyst, in which the ratio (Ep/SH (epoxy groups/thiol groups)) of the total molar number (Ep) of epoxy groups contained in the compound having plural epoxy groups to the total molar number (SH) of thiol groups contained in the polythiol compound is 0.50 or higher but lower than 2.00, is provided.

According to another aspect of the disclosure, an adhesive that includes the composition described above is provided. According to still another aspect of the disclosure, a layered body that includes, in this order, a rubber layer, an adhesion layer formed using the composition described above, and another layer, is provided.

DETAILED DESCRIPTION

Composition

The composition according to the present disclosure is a composition that includes:

a polythiol compound (hereinafter also referred to as "polythiol compound (A)");

a compound having plural epoxy groups (hereinafter also referred to as "compound (B) having plural epoxy groups);

a radical generator (hereinafter also referred to as "radical generator (C)"); and an amine-based catalyst (hereinafter also referred to as "amine-based catalyst (D)"), in which the ratio (Ep/SH (epoxy groups/thiol groups)) of the total molar number (Ep) of epoxy groups contained in the compound having plural epoxy groups to the total molar number (SH) of thiol groups contained in the polythiol compound is 0.50 or higher but lower than 2.00.

With regard to the adhesion of vulcanized rubber, although vulcanized rubber may be adhered to another member via a polyurethane-based adhesive via the method disclosed in JP-A No. H10-139901, there is still room for improvement in the adhesive power.

In contrast, according to the present disclosure, a composition capable of exhibiting a high adhesive power to rubber, an adhesive that includes the composition, and a layered body in which an adhesion layer formed using the composition and a rubber layer are adhered to each other, can be provided.

As described above, a composition according to the present disclosure is able to exhibit a high adhesive power to, particularly, rubber. Further, the composition according to the present disclosure is able to exhibit a high adhesive power to vulcanized rubber as well as to unvulcanized rubber. Although the reason therefor is not clear, it is presumed that the following may be the reason.

First, it is conceivable that the composition according to the present disclosure strongly hardens through an anionic polymerization reaction between a part of the amount of the polythiol compound (A) and the compound (B) having plural epoxy groups. An adhesion layer formed using the composition according to the present disclosure thereby may acquire sufficient film strength, conceivably due to the strong hardening.

The remaining amount of polythiol compound (A) becomes a thiyl radical as a result of the radical generator (C) that has been activated by energy, such as heat or light. It is conceivable that the so-formed thiyl radical reacts with a carbon-carbon double bond present in rubber. The composition according to the present disclosure exhibits high interfacial adhesive power to rubber, conceivably because the composition according to the present disclosure chemically binds to rubber through the thiol-ene reactions as described above. In particular, the composition according to the present disclosure exhibits high interfacial adhesive power to vulcanized rubber as well as to unvulcanized rubber, conceivably because carbon-carbon double bonds are present not only in unvulcanized rubber but also in vulcanized rubber.

As described above, an adhesion layer having both high interfacial adhesive power to rubber and high film strength can be formed using the composition according to the present disclosure. Therefore, when a composition according to the present disclosure is used as an adhesive, high adhesive power to an adherend (particularly, rubber) can be exhibited.

It is also conceivable that chemical bonding between a sulfur atom in a thiol group in the polythiol compound (A) and a carbon atom in a carbon-carbon bond occurs as a result of a hydrogen abstraction reaction from the main chain formed by carbon-carbon bonds present in the rubber. Therefore, the composition according to the present disclosure is able to exhibit adhesive power to rubber even when carbon-carbon double bonds are not necessarily present in the rubber.

Use of the composition according to the present disclosure enables sufficiently high adhesive power to be exhibited with respect to rubbers in general, even in the case where surface roughening treatment, such as grinding, is not carried out on the surfaces of the adhesion faces of the rubbers, conceivably because the composition and the rubber chemically bind to each other as described above. Omitting a surface roughening treatment on the adhesion face of the rubber, as described above, provides for simplification and improved efficiency of an adhesion process. Nevertheless, it is acceptable to carry out surface roughening treatment on the adhesion face of the rubber when using a composition according to the present disclosure. In particular, when using a liquid-form or paste-form adhesive that includes the composition according to the present disclosure, surface roughening treatment may be carried out on the adhesion face of the rubber, thereby improving the adhesive power via the utilization of an anchor effect.

Since the composition according to the present disclosure is able to exhibit high adhesive power to vulcanized rubber, adhesion can be achieved at a remarkably lower temperature and over a remarkably shorter length of time (for example, from 100 to 150° C. for from 3 to 30 minutes) than when unvulcanized rubber materials are brought into contact with each other and adhesion is performed while vulcanizing them.

In the present specification, the polythiol compound (A), the compound (B) having plural epoxy groups, the radical generator (C), the amine-based catalyst (D), and the aftermentioned surface adjustor (E) are also referred to as "component (A)", "component (B)", "component (C)", "component (D)", and "component (E)", respectively, in some cases.

<Polythiol Compound (A)>

In the present disclosure, the term "polythiol compound" refers to a compound having two or more thiol groups in one molecule thereof. As the component (A), one polythiol compound may be used singly, or two or more polythiol compounds may be used in combination.

In the polythiol compound (A), the number of thiol groups in one molecule thereof is not particularly limited as long as the above-defined relationship with the total molar number of epoxy groups in the component (B) is satisfied. From the viewpoint of improving the adhesive power, the polythiol compound (A) preferably has three or more thiol groups in one molecule thereof. The upper limit of the number of thiol groups in one molecule of the polythiol compound (A) is not particularly limited, and may be selected, as appropriate, as long as the effects according to the present disclosure are not impaired. The number of thiol groups in one molecule may usually be within the range of from 2 to 7, preferably within the range of from 3 to 6, and more preferably within the range of from 3 to 4, although the number may vary depending on whether the polythiol compound (A) is a low-molecular-weight compound or a high-molecular-weight compound. However, these ranges should not be construed as limiting the scope of the disclosure.

The scope of the polythiol compound (A) encompasses primary thiols, secondary thiols, and tertiary thiols. Primary thiols are preferable from the viewpoint of improving the adhesive power.

The molecular weight of the polythiol compound (A) is preferably 3000 or less, more preferably 2000 or less, still more preferably 1000 or less, further more preferably 900 or less, and particularly preferably 800 or less, from the viewpoint of improving the adhesive power. Further, the lower limit of the molecular weight of the polythiol compound (A) is not particularly limited. The lower limit of the molecular weight of the polythiol compound (A) is preferably 200 or more, and still more preferably 300 or more. When the polythiol compound (A) is a polymer, the "molecular weight" refers to the styrene-equivalent number average molecular weight.

Examples of the polythiol compound (A) include an aliphatic polythiol that may include a heteroatom and an aromatic polythiol that may include a heteroatom. An aliphatic polythiol that may include a heteroatom is preferable from the viewpoint of improving the adhesive power.

The "aliphatic polythiol that may include a heteroatom" refers to an aliphatic compound that has two or more thiol groups in one molecule thereof and that may include a heteroatom. The "aromatic polythiol that may include a heteroatom" refers to an aromatic compound that has two or more thiol groups in one molecule thereof and that may include a heteroatom.

From the viewpoint of improving the adhesive power, the included heteroatom, or heteroatoms, is preferably at least one kind selected from the group consisting of oxygen, nitrogen, sulfur, phosphorus, halogen, and silicon; is more preferably at least one kind selected from the group consisting of oxygen, nitrogen, sulfur, phosphorus, and halogen; and is particularly preferably at least one kind selected from the group consisting of oxygen, nitrogen, and sulfur.

(Aliphatic Polythiol that May Include Heteroatom)

Examples of the aliphatic polythiol that may include a heteroatom include: a polythiol in which the portion other than the thiol groups is an aliphatic hydrocarbon, such as an alkanedithiol having from 2 to 20 carbon atoms; a polythiol obtainable by replacing halogen atoms of a halohydrin adduct of an alcohol with thiol groups; a polythiol that is a hydrogen sulfide reaction product of a polyepoxide compound; a thioglycolic acid ester obtainable by an ester-forming reaction between a polyhydric alcohol having from 2 to 6 hydroxyl groups in a molecule thereof and thioglycolic acid; a mercapto fatty acid ester obtainable by an ester-forming reaction between a polyhydric alcohol having from 2 to 6 hydroxyl groups in a molecule thereof and a mercapto fatty acid; a thiol isocyanurate compound obtainable by a reaction between an isocyanurate compound and a thiol; a thiol that includes a polysulfide group; a silicone modified with thiol groups; and silsesquioxane modified with thiol groups.

Examples of the polyhydric alcohol having from 2 to 6 hydroxyl groups in a molecule thereof include an alkanediol having from 2 to 20 carbon atoms, a poly(oxyalkylene) glycol, glycerol, diglycerol, trimethylolpropane, ditrimethylolpropane, pentaerythritol, and dipentaerythritol.

Among the above-exemplified aliphatic polythiols that may include a heteroatom, from the viewpoint of improving the adhesive power, a polythiol in which the portion other than the thiol groups is an aliphatic hydrocarbon, a polythiol obtainable by replacing halogen atoms of a halohydrin adduct of an alcohol with thiol groups, a polythiol that is a hydrogen sulfide reaction product of a polyepoxide compound, a thioglycolic acid ester, a mercapto fatty acid ester, and a thiol isocyanurate compound are preferable; a mercapto fatty acid ester and a thiol isocyanurate compound are more preferable; and a mercapto fatty acid ester is particularly preferable. From similar viewpoints, a thiol that does not include a polysulfide group or a siloxane bond is also preferable.

(Polythiol in which the Portion Other than Thiol Groups is Aliphatic Hydrocarbon)

The polythiol in which the portion other than thiol groups is an aliphatic hydrocarbon is, for example, an alkanedithiol having from 2 to 20 carbon atoms.

Examples of the alkanedithiol having from 2 to 20 carbon atoms include 1,2-ethanedithiol, 1,1-propanedithiol, 1,2-propanedithiol, 1,3-propanedithiol, 2,2-propanedithiol, 1,4-butanedithiol, 2,3-butanedithiol, 1,5-pentanedithiol, 1,6-hexanedithiol, 1,8-octanedithiol, 1,10-decanedithiol, 1-1-cyclohexanedithiol, and 1,2-cyclohexanedithiol.

(Thioglycolic Acid Ester)

Examples of the thioglycolic acid ester include 1,4-butanediol bisthioglycolate, 1,6-hexanediol bisthioglycolate, trimethylolpropane tristhioglycolate, and pentaerythritol tetrakisthioglycolate.

(Mercapto Fatty Acid Ester)

The mercapto fatty acid ester is preferably a β-mercapto fatty acid ester having a primary thiol group, and is more preferably a β-mercaptopropionic acid ester of a polyhydric alcohol having from 2 to 6 hydroxyl groups in a molecule thereof, from the viewpoint of improving the adhesive power. Further, the mercapto fatty acid ester having a primary thiol group preferably has from 4 to 6 thiol groups in one molecule thereof, more preferably has 4 or 5 thiol groups in one molecule thereof, and further preferably has 4 thiol groups in one molecule thereof, from the viewpoint of improving the adhesive power.

Preferable examples of the β-mercaptopropionic acid ester having a primary thiol group include tetraethyleneglycol bis(3-mercaptopropionate) (EGMP-4), trimethylolpropane tris(3-mercaptopropionate) (TMMP), pentaerythritol tetrakis(3-mercaptopropionate) (PEMP), and dipentaerythritol hexakis(3-mercaptopropionate) (DPMP). Among these, PEMP and DPMP are preferable, and PEMP is more preferable.

The β-mercaptopropionic acid ester having a secondary thiol group is, for example, an ester between a polyhydric alcohol having from 2 to 6 hydroxyl groups in a molecule thereof and β-mercaptobutanoic acid, and specific examples thereof include 1,4-bis(3-mercaptobutylyloxy)butane and pentaerythritol tetrakis(3-mercaptobutyrate).

(Thiol Isocyanurate Compound)

The thiol isocyanurate compound, which is obtainable via a reaction between an isocyanurate compound and a thiol, is preferably a thiol isocyanurate compound having a primary thiol group, from the viewpoint of improving the adhesive power. Further, the thiol isocyanurate compound having a primary thiol group preferably has 2 to 4 thiol groups in one molecule thereof, and more preferably has 3 thiol groups in one molecule thereof, from the viewpoint of improving the adhesive power.

The thiol isocynaurate compound having a primary thiol group is preferably tris-[(3-mercaptopropionyloxy)-ethyl]-isocyanurate (TEMPIC).

(Silicone Modified with Thiol Group)

Examples of the silicone modified with thiol groups include mercapto-modified silicone oils such as KF-2001, KF-2004, and X-22-167B (tradenames, manufactured by Shin-etsu Chemical Co., Ltd.), SMS042 and SMS022 (tradenames, manufactured by Gelest Inc.), and PS849 and PS850 (tradenames, manufactured by UCT Inc.).

(Aromatic Polythiol that May Include Heteroatom)

Examples of aromatic polythiols that may be used as the polythiol compound (A) include the aromatic polythiols listed below. As described above, the aromatic polythiol may include a heteroatom. Specifically, examples of the aromatic polythiols include 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,2,4-tris(mercaptoethyl)benzene, 1,3,5-tris(mercaptoethyl)benzene, 2,5-toluenedithiol, 3,4-toluenedithiol, 1,3-di(p-methoxyphenyl)propane-2,2-dithiol, 1,3-diphenylpropane-2,2-dithiol, phenylmethane-1,1-dithiol, and 2,4-di(p-mercaptophenyl)pentane.

<Compound (B) Having Plural Epoxy Groups>

In the present disclosure, the term "compound having plural epoxy groups" refers to a compound having two or more epoxy groups in one molecule thereof. As the component (B), one compound having plural epoxy groups may be used singly, or two or more compounds each having plural epoxy groups may be used in combination.

In the component (B), the number of epoxy groups in one molecule thereof is not particularly limited, as long as the above-defined relationship with the total molar number of thiol groups of the component (A) is satisfied. From the viewpoint of improving the adhesive properties and the durability of adhesion, the number of epoxy groups in one molecule of the component (B) is usually, as appropriate, within a range of 2 or more, although the number may vary depending on whether the component (B) is a low-molecular-weight compound or a high-molecular-weight compound.

The epoxy equivalent weight (the mass of the resin that includes one equivalent of epoxy groups) of the compound (B) having plural epoxy groups is preferably 3000 or less, more preferably 2000 or less, still more preferably 1000 or less, further more preferably 900 or less, and particularly preferably 800 or less, from the viewpoint of improving the adhesive properties. The lower limit of the molecular weight of the component (B) is not particularly limited, and is preferably, for example, 50 or more, and more preferably 100 or more. When component (B) is a polymer, the "molecular weight" refers to the styrene-equivalent number average molecular weight.

Examples of the compound (B) having plural epoxy groups include an aromatic epoxide, an aliphatic epoxide, an alicyclic epoxide, and modified products thereof. Among these, an aromatic epoxide having a ring structure other than a glycidyl group, an alicyclic epoxide having a ring structure other than a glycidyl group, and modified products thereof are preferable. From the viewpoint of improving the adhesive power of the adhesion layer, the aromatic epoxide preferably has two or more aromatic rings. The alicyclic epoxide preferably has three or more alicyclic rings.

Examples of the aromatic epoxide include: bisphenol-type aromatic epoxides such as a bisphenol A-type epoxy compound, a bisphenol F-type epoxy compound, and a bisphenol S-type epoxy compound; novolac resin-type aromatic epoxides such as a phenol novolac-type epoxy compound and a cresol novolac-type epoxy compound; and other aromatic epoxides such as a polyphenol-type epoxy compound, a biphenyl-type epoxy compound, a naphthalene ring-containing epoxy compound, and a fluorene-type epoxy compound. The aromatic epoxide may have a urethane skeleton.

Examples of the aliphatic epoxide include a polyalkyleneglycol diglycidyl ether such as trimethyolpropane triglycidyl ether, and a polyglycidyl ether of a polyhydric alcohol such as glycerin.

The alicyclic epoxide is, for example, an alicyclic epoxide such as cyclohexane dimethanol diglycidyl ether. The alicyclic epoxide may have a urethane skeleton.

Modified products of the aromatic, aliphatic or alicyclic epoxide include modified products of aromatic epoxides such as a hydrogenated bisphenol A-type epoxy compound, a hydrogenated bisphenol F-type epoxy compound, a hydorgenated biphenyl-type epoxy compound, and a brominated bisphenol-type epoxy compound.

Among them, a cresol novolac-type epoxy compound (for example, JER152 (tradename, manufactured by Mitsubishi Chemical Corporation), which is the following epoxy compound B-1), a bisphenol A-type epoxy compound (for example JER1001B80 (tradename, manufactured by Mitsubishi Chemical Corporation), which is the following epoxy compound B-2, or EP-4100 (tradename, manufactured by ADEKA Corporation), which is the following epoxy compound B-3), an aromatic epoxide having a urethane skeleton (for example, the following epoxy compound B-4), an alicyclic epoxide having a urethane skeleton (for example, the following epoxy compound B-5), and a hydrogenated bisphenol A-type epoxy compound (for example, EPOLIGHT4000 (tradename, manufactured by KYOEISHA CHEMICAL Co., Ltd.), which is the following epoxy compound B-6) are preferable.

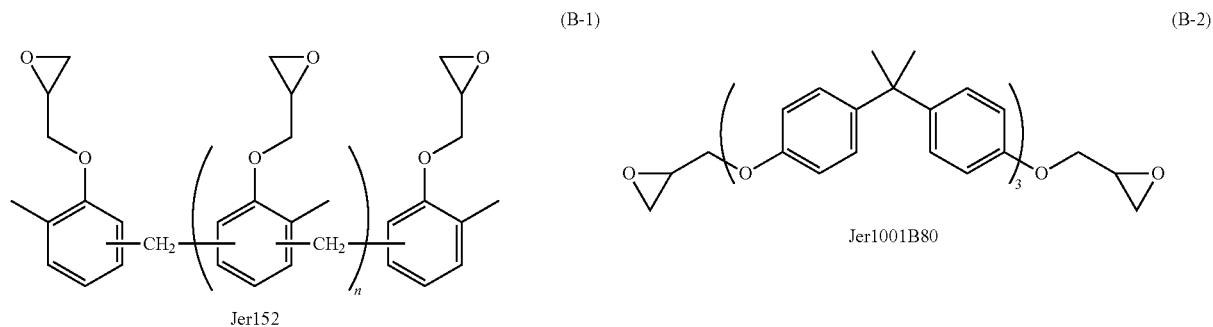

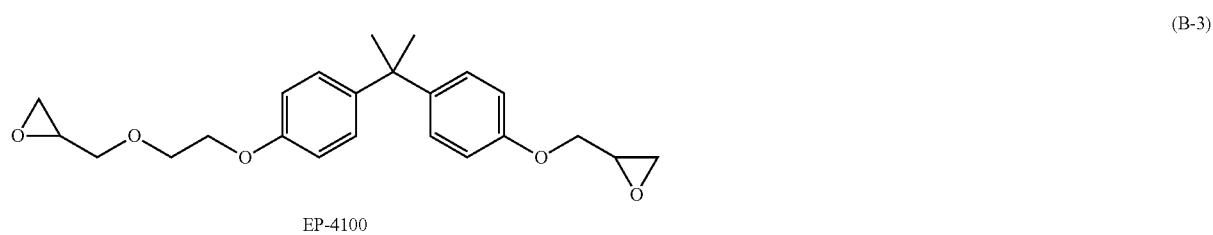

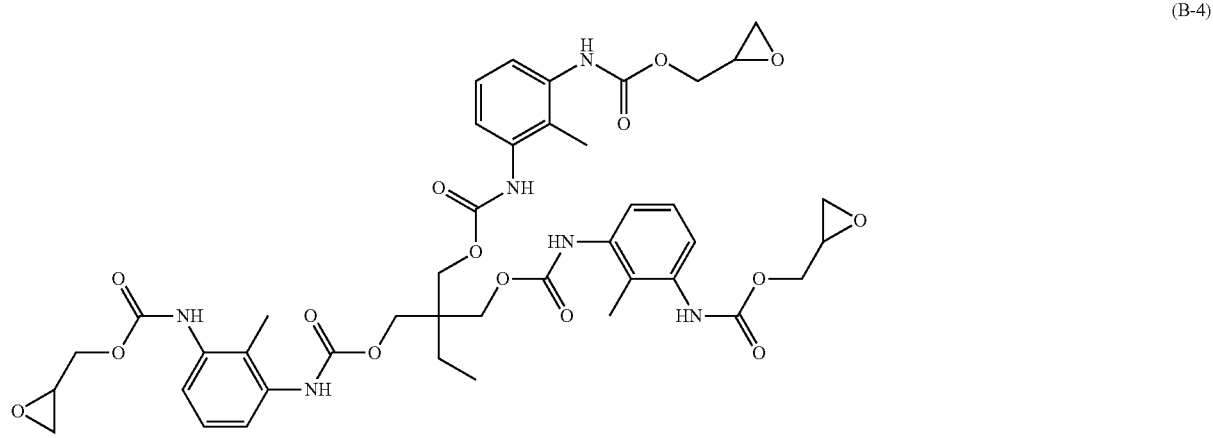

Here, epoxy compound B-4 illustrated above can be synthesized in the following manner. Specifically, epoxy compound B-4 can be synthesized by adding, at 70° C., glycidol (for example, a product manufactured by Junsei Chemical Co., Ltd.) to an isocyanate oligomer having a TDI adduct structure (for example, DESMODUR L-75 (tradename) manufactured by Bayer) such that the number of NCO groups becomes the same as the number of OH groups, and further adding a tin-based catalyst (for example, NEOSTANN U-100 (tradename) manufactured by Nitto Kasei Co., Ltd.) in an amount of 0.05% by mass.

(B-5)

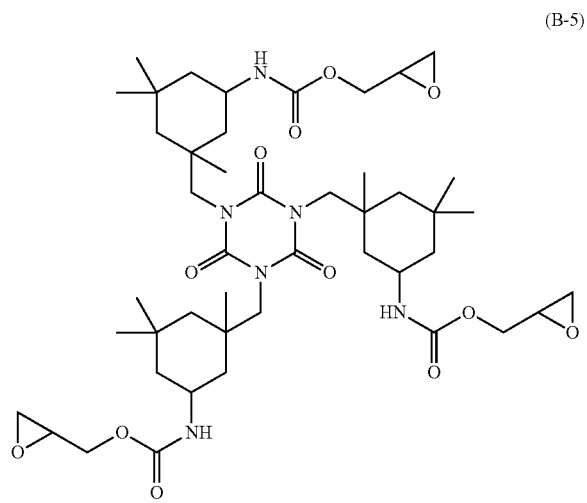 [SMILES: CC1(C)CC(NC(=O)OCC2CO2)CC(C)(Cn2c(=O)n(CC3(C)CC(NC(=O)OCC4CO4)CC(C)(C)C3)c(=O)n(CC3(C)CC(NC(=O)OCC4CO4)CC(C)(C)C3)c2=O)C1]

Here, epoxy compound B-5 illustrated above can be synthesized in the following manner. Specifically, epoxy compound B-5 can by synthesized by adding, at 70° C., glycidol (for example, a product manufactured by Junsei Chemical Co., Ltd.) to an isocyanate oligomer having an IPDI isocyanurate structure (for example, DESMODUR Z4470BA manufactured by Bayer) such that the number of NCO groups becomes the same as the number of OH groups, and further adding a tin-based catalyst (for example, NEOSTANN U-100 (tradename) manufactured by Nitto Kasei Co., Ltd.) in an amount of 0.05% by mass.

(B-6)

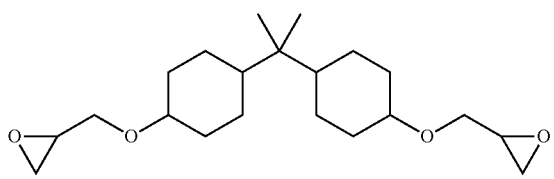

EPOLIGHT 4000

In the case of using a mercapto fatty acid ester and a thiol isocyanurate compound as the polythiol compound (A), it is preferable to use one ring-structure-containing epoxy compound singly, or two or more ring-structure-containing epoxy compounds in combination, as the compound (B) having plural epoxy groups. Among them, it is more preferable to use one bisphenol A skeleton epoxy or urethane bond-containing epoxy compound singly, or two or more selected from the group consisting of bisphenol A skeleton epoxy compounds and urethane bond-containing epoxy compounds in combination.

<Radical Generator (C)>

The term "radical generator" refers to a compound that generates a radical when energy from, for example, light or heat is imparted to the compound. The radical generator(s) (C) to be used may be at least one selected from the group consisting of a thermal radical generator and a photoradical generator. Among them, thermal radical generators are preferable, and thermal radical generators including a peroxide are more preferable, from the viewpoints of improving the adhesive power and enabling the adhesion of a light-non-transmissive rubber. Examples of the thermal radical generators including a peroxide include thermal radical generators including an organic peroxide and thermal radical generators including an inorganic peroxide. Thermal radical generators including an organic peroxide are preferable.

One radical generator may be used singly as the radical generator (C), or two or more radical generators may be used in combination as the radical generator (C).

The thermal radical generator(s) including an organic peroxide to be used is, for example, at least one selected from the group consisting of t-butyl peroxy-2-ethylhexanoate, dilauroyl peroxide, 1,1,3,3-tetramethylbutyl peroxy-2-ethylhexanoate, 1,1-di(t-hexylperoxy)cyclohexanone, di-t-butyl peroxide, t-butyl cumyl peroxide, 1,1-di(t-hexylperoxy)-3,3,5-trimethylcyclohexane, t-amyl peroxy-2-ethylhexanoate, di(2-t-butylperoxyisopropyl)benzene, di(t-butyl) peroxide, peroxybenzoyl 1,1'-di(2-t-butylperoxyisopropyl)benzene, peroxybenzoyl, 1,1-di(t-butylperoxy)cyclohexane, di(3,5,5-trimethylhexanoyl) peroxide, t-butyl peroxyneodecanoate, t-hexyl peroxyneodecanoate, and dicumyl peroxide. Among these, the thermal radical generator(s) including an organic peroxide is preferably at least one selected from the group consisting of t-butyl peroxy-2-ethylhexanoate, dilauroyl peroxide, 1,1,3,3-tetramethylbutyl peroxy-2-ethylhexanoate, 1,1-di(t-hexylperoxy)cyclohexanone, di-t-butyl peroxide and t-butyl cumyl peroxide. One thermal radical generator including an organic peroxide may be used, or two or more thermal radical generators each including an organic peroxide may be used in combination.

The thermal radical generator including an inorganic peroxide is, for example, a redox radical generator composed of a combination of an oxidant and a reductant, such as a combination of a hydrogen peroxide and an iron (II) salt or a combination of a persulfuric acid salt and sodium hydrogen sulfite. One thermal radical generator including an inorganic peroxide may be used singly, or two or more thermal radical generators each including an inorganic peroxide may be used in combination.

Known photoradical generators may widely be used, without particular limitations.

The photoradical generator is, for example, an intramolecular fission-type photoradical generator, and examples thereof include: benzoin alkyl ether-based photoradical generators such as benzoin ethyl ether, benzoin isobutyl ether, and benzoin isopropyl ether; acetophenone-based photoradical generators such as 2,2-diethoxyacetophenone and 4'-phenoxy-2,2-dichloroacetophenone; propiophenone-based photoradical generators such as 2-hydroxy-2-methylpropiophenone, 4'-isopropyl-2-hydroxy-2-methylpropiophenone, and 4'-dodecyl-2-hydroxy-2-methylpropiophenone; benzil dimethyl ketal; 1-hydroxycyclohexyl phenyl ketone; anthraquinone-based photoradical generators such as 2-ethylanthraquinone and 2-chloroanthraquinone; and acylphosphine oxide-based photoradical generators.

Further examples include hydrogen abstraction-type photoradical generators such as benzophenone/amine-based photoradical generators, Michiller's ketone/benzophenone-based photoradical generators, and thioxanthone/amine-based photoradical generators. Non-extractable photoradical generators are also usable for avoiding migration of unreacted portion of photoradical generator. Examples thereof include the polymerized form of an acetophenone-based radical generator and a substance obtainable by adding a double bond of an acryl group to benzophenone.

The photoradical generator, such as those described above, may be used singly, or in combination of two or more thereof.

<Amine-Based Catalyst (D)>

In the present disclosure, the term "amine-based catalyst" refers to a catalyst that has an amine skeleton and that contributes to the reaction of abstracting a proton from a thiol group in the polythiol compound (A). The reaction of abstracting a proton is an initiation reaction for anionic polymerization between thiol groups and epoxy groups.

The amine-based catalyst is, for example, a diamine, and specific examples thereof include bis(2-dimethylaminoethyl) ether, N,N,N',N'-tetramethyl hexamethylenediamine, triethylenediamine (TEDA), benzyl dimethyl amine, 2,2'-dimorpholinoethyl ether, and N-methylmorpholine. Among these, triethylenediamine (TEDA) is preferable. The catalyst, such as those described above, may be used singly, or in combination of two or more thereof.

<Optional Components>

The composition according to the present disclosure may further include optional components. Examples of optional components include urethanization catalysts, surface controllers, solvents, binders, fillers, pigment dispersants, electric conductivity imparting agents, ultraviolet absorbers, antioxidants, anti-drying agents, penetrants, pH adjusters, metal chelating agents, mildewproof agents, antibacterial agents, surfactants, plasticizers, waxes, and leveling agents.

(Surface Controller (E))

The composition according to the present disclosure may further include a surface controller (hereinafter also referred to as "surface controller (E)"), as necessary. Any surface controller may be used as the surface controller (E). Examples of the surface controller include acrylic surface controllers, vinyl-based surface controllers, silicone-based surface controllers, fluorine-based surface controllers and silicone acrylate-based surface controllers. Among these, silicone acrylate-based surface controllers are preferable from the viewpoints of compatibility and the ability to decrease surface tension.

(Solvent)

The composition according to the present disclosure may include a solvent, as necessary. The solvent may be any solvent that does not react with other components, without particular limitation. Examples thereof include aromatic solvents and aliphatic solvents.

Specific examples of the aromatic solvents include toluene and xylene. Examples of the aliphatic solvents include hexane, methyl ethyl ketone (MEK), and butyl acetate.

(Other Components)

The composition according to the present disclosure may include a compound that includes a carbon-carbon double bond, as an optional component.

However, a high content of the compound that includes a carbon-carbon double bond results in a reaction between the polythiol compound (A) and the compound that includes a carbon-carbon double bond. This reaction makes it difficult for the polythiol compound (A) and a carbon-carbon double bond in the rubber to undergo a thiol-ene reaction in some cases, and may decrease the adhesive power of the composition with respect to the rubber. Or, a high content of the compound that includes a carbon-carbon double bond may make difficult the occurrence of a chemical bonding reaction between a sulfur atom of a thiol group of the polythiol compound (A) and a carbon atom in a carbon-carbon bond due to a hydrogen abstraction reaction from the main chain of the rubber formed by carbon-carbon bonds, and may decrease the adhesive power of the composition with respect to the rubber. Therefore, the ratio of the total molar number of carbon-carbon double bonds contained in the carbon-carbon double bond-containing compound contained in the composition relative to the total molar number of thiol groups contained in the polythiol compound (A) contained in the composition (carbon-carbon double bonds/thiol groups) is preferably lower than 0.4, more preferably lower than 0.1, still more preferably 0.08 or lower, further more preferably 0.05 or lower, and particularly preferably 0.01 or lower.

Here, the total molar number of carbon-carbon double bonds contained in the carbon-carbon double bond-containing compound contained in the composition can be obtained by multiplying the molar number of the compound contained in the composition by the number of carbon-carbon double bonds contained in one molecule of the compound.

The molar ratio (carbon-carbon double bonds/thiol groups) can be obtained by dividing the obtained total molar number of contained carbon-carbon double bonds by the total molar number of thiol groups contained in the polythiol compound (A) contained in the composition.

<Contents of Individual Components>

The ratio (Ep/SH) of the total molar number (Ep) of epoxy groups contained in the compound (B) having plural epoxy groups to the total molar number (SH) of thiol groups contained in the polythiol compound (A) is 0.50 or higher but lower than 2.00. When the ratio (Ep/SH) is lower than 0.50, the composition may not harden with sufficient tightness, and the adhesive power may decrease. When the ratio (Ep/SH) is 2.00 or higher, the amount of thiol groups in the component (A) is small relative to the amount of epoxy groups in the component (B), as a result of which the thiol-ene reaction between thiol groups and carbon-carbon double bonds on the rubber surface may not sufficiently proceed, the composition may not tightly adhere to the rubber, and the interfacial adhesive power may decrease. Therefore, the ratio (Ep/SH) is, for example, from 0.50 to 1.80. The ratio (Ep/SH) is preferably 0.60 or higher. The ratio (Ep/SH) is preferably 1.5 or lower. The ratio (Ep/SH) is more preferably from 0.8 to 1.3.

The total molar number (SH) of thiol groups contained in the polythiol compound (A) can be obtained by multiplying the molar number of the polythiol compound (A) by the number of thiol groups contained in one molecule of the polythiol compound (A). In other words, the total molar number (SH) of thiol groups contained in the polythiol compound (A) refers to the total amount of thiol groups contained in the total amount of polythiol compound (A) contained in the composition according to the present disclosure, and does not refer to the number of thiol groups contained in one molecule of the polythiol compound.

Further, the total molar number (Ep) of epoxy groups contained in the compound (B) having plural epoxy groups can be obtained by dividing the weight content of the compound (B) having plural epoxy groups by the theoretical molecular weight thereof, and multiplying the obtained value by the number of epoxy groups contained in one molecule of the compound (B) having plural epoxy groups.

In other words, the total molar number (Ep) of epoxy groups contained in the compound (B) having plural epoxy groups refers to the total amount of epoxy groups contained in the total amount of compound (B) having plural epoxy groups contained in the composition according to the present disclosure, and does not refer to the number of epoxy groups contained in one molecule of the compound having plural epoxy groups.

When it is difficult to calculate the theoretical molecular weight of the compound (B) having plural epoxy groups (for example, when the component (B) is a polymer (epoxy resin) and the molecular weight of the component (B) is represented by a frequency distribution), the number of epoxy groups contained in one molecule of the component (B) can be calculated using the following method.

Specifically, the epoxy equivalent weight of the epoxy resin (the mass of the resin that includes one equivalent of epoxy groups) is measured using the method according to JIS K7236:2001. The number average molecular weight of the epoxy resin is divided by the obtained epoxy equivalent weight to calculate the number of epoxy groups contained in one molecule of the component (B). Here, the number average molecular weight refers to a styrene-equivalent number average molecular weight. The number average molecular weight of the epoxy resin can be obtained using a chromatographic method.

When the total molar number (SH) of thiol groups or the total molar number (Ep) of epoxy groups is obtained after the composition has been prepared or after the adhesion layer has been formed, the molecular structures and the contents of the component (A) and the component (B) contained in the composition (the composition before it forms an adhesion layer) may be determined using known measurement methods, such as an NMR measurement or an IR measurement, and then the values of SH and Ep may be obtained using the method described above.

The ratio of the total molar number of the radical generator (C) contained in the composition to the total molar number of thiol groups contained in the polythiol compound (A) (radical generator (C)/thiol groups) is preferably 0.025 or higher. When the ratio is 0.025 or higher, the composition is able to exhibit sufficient adhesive power. From the same viewpoint, the ratio (radical generator (C)/thiol groups) is preferably 0.03 or higher, more preferably 0.035 or higher, and particularly preferably 0.04 or higher. From the viewpoint of the improvement in adhesiveness, the ratio (radical generator (C)/thiol groups) is preferably 0.5 or lower, more preferably 0.45 or lower, and particularly preferably 0.4 or lower.

The content of the amine-based catalyst (D) in the composition according to the present disclosure is preferably 0.005 parts by mass to 5 parts by mass, more preferably from 0.01 parts by mass to 4 parts by mass, and particularly preferably from 0.05 parts by mass to 3.5 parts by mass, relative to 100 parts of the polythiol compound (A), from the viewpoint of increasing the film strength and the adhesive power by sufficiently promoting the reaction between the polyol compound (A) and the compound (B) having plural epoxy groups.

As described above, the composition according to the present disclosure may include optional components (for example, the surface controlling agent (E), the compound that includes a carbon-carbon double bond, or the solvent) in addition to the components (A) to (D). However, from the viewpoint of strongly adhering to rubber, particularly to vulcanized rubber, the total content of the components (A) to (D), excluding solvents, in the composition is preferably 80% by mass or higher, more preferably 90% by mass or higher, still more preferably 95% by mass or higher, and further preferably 98% by mass or higher, with respect to the total amount, excluding solvents, of the composition.

From the same viewpoint, the total content of the components (A) to (E), excluding solvents, in the composition is preferably 90% by mass or higher, more preferably 95% by mass or higher, still more preferably 99% by mass or higher, and further preferably 100% by mass, with respect to the total amount, excluding solvents, of the composition.

As described above, the composition according to the present disclosure is able to exhibit high adhesive power to rubber. Thus, the composition according to the present disclosure can suitably be used, as a composition for adhesion, in an adhesive particularly suitable for application to rubber as described below, or in a layered body that includes a rubber layer and an adhesion layer. However, the applications of the composition according to the present disclosure are not limited thereto; for example, colored particles or the like may be incorporated into the composition according to the present disclosure, in which case the composition may be used as a coating material for imparting decoration.

[Adhesive]

The adhesive according to the present disclosure includes the composition according to the present disclosure. The adhesive may include components other than the composition according to the present disclosure, so long as the purpose of the present disclosure is not hindered. However, from the viewpoint of enabling the effect of the present disclosure to be favorably exerted, the content of the composition in the adhesive is preferably 90% by mass or higher, more preferably 95% by mass or higher, still more preferably 99% by mass or higher, and further preferably 100% by mass, with respect to the total amount, excluding solvents, of the adhesive.

[Layered Body]

The layered body according to the present disclosure includes, in the recited order, a rubber layer, an adhesion layer formed using the composition according to the present disclosure, and another layer. In other words, the layered body according to the present disclosure is a layered body (laminated body) which includes plural layers adhered to one another, and in which at least one of the layers is a rubber layer, and in which the rubber layer is adhered to an adjacent layer via an adhesion layer formed using the composition or the adhesive according to the present disclosure. Here, the rubber layer and the another layer are not particularly limited except that they should have an adhesion face with which the adhesion layer contacts; the adhesion face is not limited to a flat plane, and may be a curved face or a face having irregularities. With respect to the rubber layer and the another layer that are adhered via the adhesion layer, the entire adhesion face of the rubber layer and/or the entire adhesion face of the another layer may be adhered via the adhesion layer, or only a part of the adhesion face of the rubber layer and/or only a part of the adhesion face of the another layer may be adhered via the adhesion layer. The layered body according to the present disclosure may have a configuration in which three or more layers, including a rubber layer, are layered with the adhesion layer(s) according to the present disclosure disposed therebetween. This configuration is not limited to a configuration in which all of the layers are adhered to one another via the adhesion layer according to the present disclosure.

Each of the other layers may be a rubber layer, or a layer other than a rubber layer, such as a glass layer, a metal layer or a resin layer.

The dimensions of each layer and the number of layers may be selected, as appropriate, in accordance with the purpose.

<Rubber Layer>

The rubber layer may be formed from vulcanized rubber or unvulcanized rubber. The rubber constituting the rubber layer preferably has a carbon-carbon double bond. In this case, it is conceivable that a carbon atom of a carbon-carbon double bond contained in the rubber layer contacting the adhesion layer forms a carbon-sulfur bond with a sulfur atom of a thiol group of the polythiol compound (A) contained in the composition according to the present disclosure.

However, it is conceivable that a layered body can be obtained even when the rubber constituting the rubber layer does not have a carbon-carbon double bond. In this case, it is conceivable that a sulfur atom of a thiol group of the polythiol compound (A) and a carbon atom of a carbon-carbon bond chemically binds to each other via a hydrogen abstraction reaction in which the polythiol compound (A) pulls out hydrogen from the main chain formed by carbon-carbon bonds present in the rubber. However, from the viewpoint of improving the adhesive power, it is preferable that the rubber constituting the rubber layer has a carbon-carbon double bond.

The material of the rubber layer is not particularly limited, and examples thereof include: natural rubber (NR); conjugated diene synthetic rubber, such as polyisoprene synthetic rubber (IR), polybutadiene rubber (BR), styrene-butadiene copolymer rubber (SBR), acrylonitrile butadiene rubber (NBR), chloroprene rubber (CR), and butyl rubber (IIR); ethylene-propylene copolymer rubber (EPM); ethylene-propylene-diene copolymer rubber (EPDM); and polysiloxane rubber. Materials for the rubber layer, such as those described above, may be used singly or in combination of two or more thereof. Among those described above, natural rubber (NR), and a mixture of natural rubber and a styrene-butadiene copolymer rubber (SBR/NR), are preferable.

<Layer Other than Rubber Layer>

Examples of the other layers than the rubber layer include a glass layer, a metal layer, and a resin layer. Strong adhesion of a metal layer or a resin layer to the rubber layer can be achieved by using the composition according to the present disclosure.

<Method for Manufacturing Layered Body>

Next, a method of producing a layered body using the adhesive according to the present disclosure (or the composition according to the present disclosure) is described.

First, the adhesive is applied to an adhesion face of a rubber layer. Then, the layer to which the adhesive has been applied is left for a predetermined period of time, if necessary, and an adhesion face of another layer that should face the rubber layer is brought into contact with the face to which the adhesive has been applied (the adhesion face of the rubber layer), to obtain a layered body. In this process, the adhesive may have been applied also to the adhesion face of the another layer that should face the rubber layer.

Then, curing is performed while a pressure (e.g., pressing) is applied to the obtained layered body in the thickness direction thereof, whereby a layered body can be produced in a favorable manner.

Alternatively, the adhesive may be applied to an adhesion face of another layer that should face a rubber layer. Then, the layer to which the adhesive has been applied is left for a predetermined period of time, if necessary, and an adhesion face of the rubber layer is brought into contact with the face to which the adhesive has been applied (the adhesion face of the another layer), to obtain a layered body. In this process, the adhesive may have also been applied to the adhesion face of the rubber layer.

Then, curing is performed while pressure (e.g., pressing) is applied to the obtained layered body in the thickness direction thereof, whereby a layered body can be produced in a favorable manner.

When the layer to which the adhesive has been applied is left to stand for a predetermined time after the application, the period during which the layer is left to stand is preferably from 0 to 30 minutes, and more preferably from 1 to 15 minutes, from the viewpoint of maintaining the shape of the adhesive such that the adhesive would not exude from the layered body at the time of curing.

When pressure is applied to the layered body, the pressure is preferably from 0 to 5 MPa, more preferably from 0 to 2.5 MPa, and particularly preferably from 0 to 1 MPa, from the viewpoint of improving the adhesive power and preventing or suppressing exudation of the adhesive from the layered body. From the same viewpoint, the pressing time is preferably from 5 to 120 minutes, more preferably from 10 to 60 minutes, and particularly preferably from 15 to 45 minutes.

When the adhesive according to the present disclosure includes a thermal radical generator as a radical generator, the curing of the adhesive is preferably performed by heating. A temperature at which the thermal radical generator generates radicals efficiently may appropriately selected as the heating temperature, and the heating temperature is preferably a temperature that is within about ±30° C. from the temperature at which the half-life of the thermal radical generator is one minute.

When the adhesive includes a photoradical generator as a radical generator, the curing is preferably performed by photoirradiation. A ultraviolet (UV) lamp may preferably be used as the light source from the viewpoints of improving the adhesive power and reducing costs. From the same viewpoint, the photoirradiation time may be preferably from several seconds to several tens of seconds.

EXAMPLES

The present disclosure is further described below in additional detail by reference to examples. However, the present disclosure is not limited to the following examples.

[Raw Materials]

The following materials were used as raw materials.

<Polythiol Compound (A) (Component (A))>

Pentaerythritol tetrakis(3-mercaptopropionate) (PEMP): a product manufactured by SC Organic Chemical Co., Ltd.

<Compound (B) Having Plural Epoxy Groups (Component (B))>

Cresol-novolac-type epoxy compound: JER152 (tradename) manufactured by Mitsubishi Chemical Corporation Bisphenol A-type Epoxy Compound: EP-4100 (tradename) manufactured by ADEKA CORPORATION Hydrogenated bisphenol A-type epoxy compound: EPO-LIGHT4000 (tradename) manufactured by KYOEISHA CHEMICAL Co., Ltd.

Epoxy Compound B-4 illustrated above

<Radical Generator (C) (Component (C))> t-butyl peroxy-2-ethylhexanoate: PERBUTYL O (tradename) manufactured by NOF CORPORATION <Amine-Based Catalyst (D) (Component (D))>
  Triethylene diamine (TEDA)
<Surface Controller (E) (Component (E))>
  Silicone acrylate-based surface controller: SIU2400 (tradename) manufactured by Toyo Chemicals Co., Ltd.

[Measurement of Total Molar Number (SH) of Thiol Groups]

The total molar number (SH) of thiol groups contained in the polythiol compound (A) was calculated by dividing the addition amount by the theoretical molecular weight, and multiplying the obtained value by the number of thiol groups contained in one molecule of the polythiol compound (A).

[Measurement of Total Molar Number (Ep) of Epoxy Groups]

Among the compounds for the component (B), the total molar number (Ep) of epoxy groups contained in JER152 as the component (B) was obtained by calculation based on the method according to JIS K7236:2001. For the other compounds used as the component (B), the total molar number (Ep) of epoxy groups was obtained by dividing the addition amount mentioned above by the theoretical molecular weight, and multiplying the obtained value by the number of epoxy groups contained in one molecule of the component (B).

[Production of Rubber]

Rubber (having a length of 100 mm, a width of 25 mm, and a thickness of 3 mm) was produced from the formulation indicated in the following Table 1.

TABLE 1

| | | Type of Rubber | |
|---|---|---|---|
| | | NR/SBR | NR |
| Formulation | NR | 15 | 100 |
| | SBR | 85 | — |
| | Carbon Black | 50 | 50 |
| | Stearic Acid | 2 | 2 |
| | Anti-aging Agent | 1 | 1 |
| | Zinc Oxide | 3 | 3 |
| | Vulcanization Accelerator 1 | 0.4 | 0.4 |
| | Vulcanization Accelerator 2 | 0.2 | 0.2 |
| | Sulfur | 1.4 | 1.4 |

*Numbers in the table indicate parts by mass

The specifics of the individual components noted in Table 1 are as follows.
Natural Rubber (NR): RSS#3
Styrene-butadiene Copolymer Rubber (SBR):
  JSR1500 (tradename) manufactured by JSR CORPORATION
Anti-aging Agent: N-phenyl-N'-(1,3-dimethylbutyl)-p-phenylenediamine (NOCRAC 6C (tradename) manufactured by OUCHI SHINKO CHEMICAL INDUSTRIAL CO., LTD.)
Vulcanization Accelerator 1:
  1,3-diphenylguanidine (NOCCELER D (D-P) (tradename) manufactured by OUCHI SHINKO CHEMICAL INDUSTRIAL CO., LTD.)
Vulcanization Accelerator 2:
  di-2-benzothiazolyl disulfide (NOCCELER DM-P (DM) (tradename) manufactured by OUCHI SHINKO CHEMICAL INDUSTRIAL CO., LTD.)

Examples and Comparative Examples

In Examples 1 to 9 and Comparative Examples 1 to 7, in which the NR/SBR was used as rubber, the relationship between the adhesive power and the ratio (Ep/SH) of the total molar number of epoxy groups contained in the addition amount of the compound (B) having plural epoxy groups to the total molar number of thiol groups contained in the addition amount of the polythiol compound (A) was studied by changing the ratio (Ep/SH).

In Examples 10 to 14 and Comparative Examples 8 to 12, in which the NR was used as rubber, the relationship between the adhesive power and the ratio (Ep/SH) was studied in the same manner as described above, except that the rubber (the NR/SBR), which was employed in Examples 1 to 9 and Comparative Examples 1 to 7, was replaced by another rubber (the NR).

The Examples and Comparative Examples are specifically described below.

Examples 1 to 9 and Comparative Examples 1 to 7

In which NR/SBR was Used as Rubber

Ingredients were mixed according to the formulation indicated in Table 2 (the number for each ingredient represents the parts by mass of non-volatile portion), to obtain a composition, and the composition was employed as an adhesive. The NR/SBR was used as the rubber.

The obtained adhesive was applied, in a thickness of 30 μm, to two rubber sheets (rubber substrates), and the coated faces were adhered to each other and curing was performed, as a result of which a layered body was prepared. The curing was performed by maintaining the adhered bodies at a temperature of 150° C. and a pressing them together at a pressure of 0.05 MPa for 20 minutes. Then, the adhesive power of the cured body of the adhesive (the adhesion layer) was measured. The results thereof (evaluation results) are indicated in Table 2.

[Method Employed for Measurement of Adhesion Power of Cured Body of Adhesive]

The opposite ends of the adjacent rubber substrates in the layered body were pulled away from each other (in the directions normal to the principal face of the rubber sheet, the directions forming an angle of 180°) under a tension rate of 50 mm/min., and the delamination strength (N/25 mm) was measured and used as an indicator of the adhesive power.

With respect to the adhesive power, a delamination strength of 100N/25 mm or greater indicates that a sufficient adhesive power at a level at which the rubber substrate breaks before delamination occurs is obtained. The delamination strength is preferably 300N/25 mm or greater. In contrast, when the delamination strength is less than 100N/25 mm, the reaction at the interface between the rubber substrate and the adhesive does not proceed sufficiently, and delamination occurs at the interface or the adhesive itself undergoes cohesive failure due to insufficient cohesive force of the adhesive. Occurrence of such a phenomenon indicates that the adhesive power is insufficient.

Examples 10 to 14 and Comparative Examples 8 to 12

In which NR was Used as Rubber

Ingredients were mixed according to the formulation indicated in the following Table 3 (the number for each ingredient indicating the parts by mass of non-volatile portion), to obtain a composition, and the obtained composition was used as an adhesive.

The obtained adhesive was cured in the same manner as described above, and the adhesive power of the cured body of the adhesive was measured in the same manner as described above. The NR was used as the rubber. The results thereof (the evaluation results) are indicated in Table 3.

TABLE 2

| Adhesive Composition | Component (A) PEMP (% by mass) | Component (B) JER152 (% by mass) | Component (B) EP-4100 (% by mass) | Component (B) EPOLIGHT 4000 (% by mass) | Component (B) B-4 (% by mass) | Component (C) PERBUTYL O (% by mass) | Component (D) TEDA (% by mass) | Component (E) SIU2400 (% by mass) | Epoxy Groups/Thiol Groups (Molar Ratio) | Component (C)/Thiol Groups (Molar Ratio) | Evaluation Adhesive Power (N/25 mm) |
|---|---|---|---|---|---|---|---|---|---|---|---|
| Comparative Example 1 | 50.45 | 21.67 | — | — | — | 26.79 | 0.08 | 1.01 | 0.30 | 0.3 | 8.24 |
| Comparative Example 2 | 49.49 | — | 23.08 | — | — | 26.28 | 0.16 | 0.99 | 0.30 | 0.3 | 4.89 |
| Comparative Example 3 | 47.05 | — | — | 26.56 | — | 24.98 | 0.47 | 0.94 | 0.30 | 0.3 | 8.69 |
| Comparative Example 4 | 42.67 | — | — | — | 33.12 | 22.66 | 0.70 | 0.85 | 0.30 | 0.3 | 20.91 |
| Example 1 | 34.95 | — | — | — | 45.23 | 18.56 | 0.56 | 0.70 | 0.50 | 0.3 | 285.13 |
| Example 2 | 33.50 | 47.98 | — | — | — | 17.79 | 0.06 | 0.67 | 1.00 | 0.3 | 138.88 |
| Example 3 | 31.97 | 50.36 | — | — | — | 16.98 | 0.05 | 0.64 | 1.10 | 0.3 | 254.71 |
| Example 4 | 26.18 | — | — | 59.14 | — | 13.90 | 0.26 | 0.52 | 1.20 | 0.3 | 170.59 |
| Example 5 | 29.24 | — | 54.55 | — | — | 15.53 | 0.10 | 0.58 | 1.20 | 0.3 | 224.10 |
| Example 6 | 29.29 | 54.52 | — | — | — | 15.55 | 0.05 | 0.59 | 1.30 | 0.3 | 212.07 |
| Example 7 | 27.02 | 58.05 | — | — | — | 14.35 | 0.04 | 0.54 | 1.50 | 0.3 | 290.53 |
| Example 8 | 25.73 | — | 60.02 | — | — | 13.66 | 0.08 | 0.51 | 1.50 | 0.3 | 364.02 |
| Example 9 | 22.97 | — | 64.29 | — | — | 12.20 | 0.08 | 0.46 | 1.80 | 0.3 | 150.31 |
| Comparative Example 5 | 22.64 | 64.85 | — | — | — | 12.02 | 0.04 | 0.45 | 2.00 | 0.3 | 1.00 |
| Comparative Example 6 | 18.78 | — | — | 70.68 | — | 9.97 | 0.19 | 0.38 | 2.00 | 0.3 | 3.00 |
| Comparative Example 7 | 14.83 | — | — | — | 76.76 | 7.87 | 0.24 | 0.30 | 2.00 | 0.3 | 8.34 |

* In the table, "—" indicates that the component is not included.

TABLE 3

| Adhesive Composition | Component (A) PEMP (% by mass) | Component (B) JER152 (% by mass) | Component (B) EP-4100 (% by mass) | Component (B) EPOLIGHT 4000 (% by mass) | Component (B) B-4 (% by mass) | Component (C) PERBUTYL O (% by mass) | Component (D) TEDA (% by mass) | Component (E) SIU2400 (% by mass) | Epoxy Groups/Thiol Groups (Molar Ratio) | Component (C)/Thiol Groups (Molar Ratio) | Evaluation Adhesive Power (N/25 mm) |
|---|---|---|---|---|---|---|---|---|---|---|---|
| Comparative Example 8 | 50.45 | 21.67 | — | — | — | 26.79 | 0.08 | 1.01 | 0.30 | 0.3 | 1.60 |
| Comparative Example 9 | 49.49 | — | 23.08 | — | — | 26.28 | 0.16 | 0.99 | 0.30 | 0.3 | 3.33 |
| Comparative Example 10 | 47.05 | — | — | 26.56 | — | 24.98 | 0.47 | 0.94 | 0.30 | 0.3 | 1.51 |
| Comparative Example 11 | 38.42 | — | — | — | 39.78 | 20.40 | 0.63 | 0.77 | 0.40 | 0.3 | 114.72 |
| Example 10 | 34.95 | — | — | — | 45.21 | 18.56 | 0.58 | 0.70 | 0.50 | 0.3 | 180.51 |
| Example 11 | 33.50 | 47.98 | — | — | — | 17.79 | 0.06 | 0.67 | 1.00 | 0.3 | 205.92 |
| Example 12 | 32.16 | — | 50.01 | — | — | 17.08 | 0.11 | 0.64 | 1.00 | 0.3 | 109.62 |
| Example 13 | 29.24 | — | 54.55 | — | — | 15.53 | 0.10 | 0.58 | 1.20 | 0.3 | 120.98 |
| Example 14 | 26.01 | 59.61 | — | — | — | 13.82 | 0.04 | 0.52 | 1.60 | 0.3 | 103.50 |
| Comparative Example 12 | 14.83 | — | — | — | 76.76 | 7.87 | 0.24 | 0.30 | 2.00 | 0.3 | 0.55 |

* In the table, "—" indicates that the component is not included.

[Evaluation]

As indicated in the tables above, the adhesive power in Examples 1 to 14 was high due to the inclusion of the components (A) to (D), and the ratio (Ep/SH) of the total molar number of epoxy groups contained in the component (B) to the total molar number of thiol groups contained in the component (A) being from 0.50 to less than 2.00.

In contrast, the adhesive power in Comparative Examples 1 to 12 was low as a result of the ratio (Ep/SH) being outside the range defined in the present disclosure.

INDUSTRIAL APPLICABILITY

The composition according to the present disclosure can suitably be used in an adhesive suitable for, particularly, application to rubber, and in a layered body including a rubber layer and an adhesion layer. However, the applications of the composition according to the present disclosure are not limited thereto, and the composition can also be used as a coating material to which colored particles or the like are incorporated, and which is used for imparting decoration or the like.

The invention claimed is:

1. A composition comprising:
a polythiol compound;
a compound having plural epoxy groups;
a radical generator; and
an amine-based catalyst,
wherein a ratio (Ep/SH (epoxy groups/thiol groups)) of a total molar number (Ep) of epoxy groups contained in the compound having plural epoxy groups to a total molar number (SH) of thiol groups contained in the polythiol compound is 0.50 or higher but lower than 2.00; and
wherein a ratio of a total molar number of the radical generator to a total molar number of thiol groups contained in the polythiol compound (radical generator/thiol groups) in from 0.025 to 0.5.

2. The composition according to claim 1, wherein the radical generator is a thermal radical generator comprising a peroxide.

3. The composition according to claim 1, wherein the polythiol compound is a primary thiol.

4. The composition according to claim 1, wherein the polythiol compound has three or more thiol groups in one molecule thereof.

5. The composition according to claim 1, wherein the polythiol compound has a molecular weight of from 200 to 3000.

6. The composition according to claim 1, wherein the polythiol compound is selected from the group consisting of: a polythiol in which the portion other than the thiol groups is an aliphatic hydrocarbon; a polythiol obtainable by replacing halogen atoms of a halohydrin adduct of an alcohol with thiol groups; a polythiol that is a hydrogen sulfide reaction product of a polyepoxide compound; a thioglycolic acid ester obtainable by an ester-forming reaction between a polyhydric alcohol having from 2 to 6 hydroxyl groups in a molecule thereof and thioglycolic acid; a mercapto fatty acid ester obtainable by an ester-forming reaction between a polyhydric alcohol having from 2 to 6 hydroxyl groups in a molecule thereof and a mercapto fatty acid; a thiol isocyanurate compound obtainable by a reaction between an isocyanurate compound and a thiol; a thiol that includes a polysulfide group; a silicone modified with thiol groups; and silsesquioxane modified with thiol groups.

7. The composition according to claim 1, wherein the compound having plural epoxy groups has an epoxy equivalent weight of 3000 or less.

8. The composition according to claim 1, wherein the compound having plural epoxy groups is selected from the group consisting of an aromatic epoxide having a ring structure other than a glycidyl group, an alicyclic epoxide having a ring structure other than a glycidyl group, and modified products thereof.

9. The composition according to claim 1, wherein the compound having plural epoxy groups is an aromatic epoxide having two or more aromatic rings.

10. The composition according to claim 1, wherein the amine-based catalyst is a diamine.

11. The composition according to claim 1, wherein the ratio (Ep/SH (epoxy groups/thiol groups)) of the total molar number (Ep) of epoxy groups contained in the compound having plural epoxy groups to the total molar number (SH) of thiol groups contained in the polythiol compound is from 0.50 to 1.80.

12. The composition according to claim 1, further comprising a surface controller.

13. An adhesive comprising the composition according to claim 1.

14. A layered body comprising, in this order, a rubber layer, an adhesion layer comprising the composition according to claim 1, and another layer, wherein the rubber layer is in contact with the adhesion layer, and wherein the adhesion layer is in contact with the another layer.

15. The layered body according to claim 14, wherein the rubber layer comprises vulcanized rubber.

16. The layered body according to claim 15, wherein the rubber layer is not subjected to surface roughening treatment prior to being contacted with the adhesion layer.

* * * * *